(12) United States Patent
Elford (10) Patent No.: US 11,579,583 B2
(45) Date of Patent: Feb. 14, 2023

(54) MULTI-STAGE INCREMENTAL SHEET FORMING SYSTEMS AND METHODS

(71) Applicant: THE BOEING COMPANY, Chicago, IL (US)

(72) Inventor: Michael C. Elford, Springfield (AU)

(73) Assignee: THE BOEING COMPANY, Chicago, IL (US)

(*) Notice: Subject to any disclaimer, the term of this patent is extended or adjusted under 35 U.S.C. 154(b) by 341 days.

(21) Appl. No.: 16/853,904

(22) Filed: Apr. 21, 2020

(65) Prior Publication Data

US 2021/0325843 A1 Oct. 21, 2021

(51) Int. Cl.
| | |
|---|---|
| *G05B 19/19* | (2006.01) |
| *B21D 31/00* | (2006.01) |
| *G05B 19/4093* | (2006.01) |
| *B21J 5/06* | (2006.01) |
| *G05B 19/402* | (2006.01) |
| *B21D 5/00* | (2006.01) |

(52) U.S. Cl.
CPC ............ *G05B 19/19* (2013.01); *B21D 5/004* (2013.01); *B21D 31/005* (2013.01); *B21J 5/06* (2013.01); *G05B 19/402* (2013.01); *G05B 19/4093* (2013.01); *G05B 2219/35167* (2013.01); *G05B 2219/36266* (2013.01)

(58) Field of Classification Search
CPC .. G05B 19/19; G05B 19/402; G05B 19/4093; G05B 2219/35167; G05B 2219/36266; G05B 19/4099; B21D 5/004; B21D 31/005; B21D 51/02; B21J 5/06; G06F 30/17; G06F 16/25
See application file for complete search history.

(56) References Cited

U.S. PATENT DOCUMENTS

| | | | |
|---|---|---|---|
| 10,010,920 B2* | 7/2018 | Ren | ........................... B21D 5/01 |
| 2001/0029768 A1* | 10/2001 | Okada | .................... B21D 22/14 |
| | | | 72/343 |

(Continued)

OTHER PUBLICATIONS

Noomane Khalifa et al., "Incremental Sheet Forming with Active Medium", 2019, CIRP Annual—manufacturing technology, Ed. 68, p. 313-316; URL:<https://www.sciencedirect.com/science/article/pii/S0007850619300691 > (Year: 2019).*

(Continued)

*Primary Examiner* — Kenneth M Lo
*Assistant Examiner* — Jonathan Michael Skrzycki
(74) *Attorney, Agent, or Firm* — The Small Patent Law Group LLC; Joseph M. Butscher (57) ABSTRACT

A multi-stage incremental sheet forming system includes a forming tool, and at least one control unit in communication with the forming tool. The at least one control unit is configured to determine a convex hull of a target structure to be formed by the forming tool. The at least one control unit is further configured to operate the forming tool according to a first tool path in relation to an initial structure to form an intermediate structure having a shape based on the convex hull of the target structure. The at least one control unit is further configured to operate the forming tool according to a second tool path in relation to the intermediate structure to form one or more inward features into the intermediate structure to form the target structure.

22 Claims, 9 Drawing Sheets

(56) References Cited

U.S. PATENT DOCUMENTS

| | | | | |
|---|---|---|---|---|
| 2012/0011915 A1* | 1/2012 | Kiridena | ............ | B21D 31/005 72/380 |
| 2014/0283571 A1* | 9/2014 | Ren | ........................ | B21D 5/01 72/115 |
| 2016/0288189 A1 | 10/2016 | Belk | | |
| 2017/0227947 A1* | 8/2017 | Ndip-Agbor | .......... | G05B 19/29 |
| 2018/0203432 A1 | 7/2018 | Walker | | |
| 2019/0286092 A1 | 9/2019 | Peters | | |
| 2020/0310382 A1* | 10/2020 | Brand | .................... | G05B 19/25 |

OTHER PUBLICATIONS

Joost Duflou et al. "Manufacture of Accurate Titanium Cranio-Facial Implants with High Forming Angle Using Single Point Incremental Forming", 2013, Key Engineering Material, vol. 549, p. 223-230, URL:<https://www.scientific.net/KEM.549.223> (Year: 2013).*

Christoph Hartmann et al. "Knowledge-based Incremental sheet-metal free-forming using probabilistic density function and voronoi partitioning" 2019, Procedia Manufacturing, vol. 29, p. 4-11; URL:<https://www.sciencedirect.com/science/article/pii/S2351978919301295 (Year: 2019).*

O'Rourke, J. (1998). Convex Hulls in Three Dimensions. In Computational Geometry in C (pp. 101-154). Cambridge: Cambridge University Press. doi:10.1017/CBO9780511804120.005. http://www.qhull.org/.

Lindam, R et al: "Automatic feature recognition and tool path strategies for enhancing accuracy in double sided incremental forming," The International Journal of Advance Manufacturing Technology, Springer, London, vol. 88, No. 5, May 20, 2016.

Chang Zhidong, et al: "Investigation on a novel quadratic spiral tool path and its effect on incremental sheet forming process," The Internal Journal of Advanced Manufacturing Technology, Spring, London, vol. 103, No. 4, Apr. 30, 2019.

Extended European Search Report for EP 21168501.1-1216, dated Jul. 30, 2021.

* cited by examiner

MULTI-STAGE INCREMENTAL SHEET FORMING SYSTEMS AND METHODS

FIELD OF THE DISCLOSURE

Embodiments of the present disclosure generally relate to multi-stage incremental sheet forming systems and methods.

BACKGROUND OF THE DISCLOSURE

Certain structures are formed through incremental sheet forming. In particular, incremental sheet forming provides a method of forming thin structures from metal. A forming tool typically includes a smooth, blunt operative head that is pushed or otherwise positioned against a surface of sheet metal that is suspended in a clamp, jig, or the like to provide a modified three-dimensional shape.

During an incremental sheet forming process, a forming tool (such as a forming stylus) traverses a tool path in order to incrementally deform a blank sheet of metal. It is common to generate the tool path from a stack of level sections of a geometry of the part to be formed, which is known as a Z level tool path.

Incremental sheet forming processes are known to be sensitive to a local wall slope angle. In general, structures having wall angles steeper than sixty degrees from a horizontal plane are typically not feasible candidates for incremental sheet forming. At sixty degrees and greater, the sheet of metal formed through an incremental sheet forming process typically thins to approximately one half of an original thickness. It has been found that attempting to form such structures through incremental sheet forming risks tearing the steep walls of the material.

Overall, single stage incremental sheet forming using a Z level tool path is often unsuccessful when applied to complex parts with features such as pockets, insets, and the like formed on steep walls (for example, walls formed at angles of at least sixty degrees). Using the Z level tool path approach, the steep walls cause excessive thinning during the forming process, which leads to (or at least risks leading to) tearing of the sheet of material. Structures having wall angles of sixty degrees or greater are typically not suited for incremental sheet forming.

SUMMARY OF THE DISCLOSURE

A need exists for a system and method of forming a structure having steep walls (for example, walls angled at sixty degrees or greater) through incremental sheet forming. Further, a need exists for an incremental sheet forming system and method that are not susceptible to damaging (for example, tearing) structural material at steep angles (for example, sixty degrees or greater).

With those needs in mind, certain embodiments of the present disclosure provide a multi-stage incremental sheet forming system, including a forming tool, and at least one control unit in communication with the forming tool. The at least one control unit is configured to determine a convex hull of a target structure to be formed by the forming tool. The at least one control unit is configured to operate the forming tool according to a first tool path in relation to an initial structure to form an intermediate structure having a shape based on the convex hull of the target structure. The at least one control unit is configured to operate the forming tool according to a second tool path in relation to the intermediate structure to form one or more inward features into the intermediate structure to form the target structure, wherein the second tool path differs from the first tool path.

In at least one embodiment, the at least one control unit includes a tool path generation control unit configured to determine at least one tool path, a tool path generation control unit configured to determine the convex hull of the target structure, and a forming control unit configured to operate the forming tool.

In at least one embodiment, the at least one control unit includes a tool path generation control unit configured to determine the convex hull of the target structure based on a smallest convex set that contains all points of the target structure.

In at least one embodiment, a structure database is in communication with the at least one control unit. The structure database stores target data including information regarding a geometric representation of the target structure, such as a size of the target structure, a shape of the target structure, the one or more inward features of the target structure, and manufacturing data including tool shape, tool size, and tool feed rate.

In at least one embodiment, the at least one control unit includes a tool path generation control unit including a convex hull determination module that analyzes target data regarding the target structure and determines the convex hull for the target structure based on the target data.

In at least one embodiment, the at least one control unit includes a tool path generation control unit including a convex hull tool path generation module that determines the first tool path based on the determined convex hull. A forming control unit operates the forming tool according to the first tool path in relation to the initial structure to form the intermediate structure having the shape based on the convex hull of the target structure. As an example, the first tool path is a Z level tool path.

In at least one embodiment, the at least one control unit includes a tool path generation control unit including a target structure tool path generation module that is configured to one or both of operate or output instructions for operating the forming tool according to the second tool path in relation to the intermediate structure to form the one or more inward features into the intermediate structure to form the target structure. As an example, the second tool path is a lace tool path.

In at least one embodiment, the one or more inward features include one or more of at least one indentation, at least one cavity, at least one divot, at least one channel, at least one recess, at least one groove, at least one crease, at least one pocket, at least one inset, or at least one hole.

In at least one embodiment, the target structure includes at least one wall set at an angle of at least sixty degrees in relation to a level plane. In at least one embodiment, the intermediate structure is devoid of the one or more inward features.

Certain embodiments of the present disclosure provide a multi-stage incremental sheet forming method, comprising determining, by at least one control unit, a convex hull of a target structure to be formed by a forming tool; operating, by the at least one control unit, the forming tool according to a first tool path in relation to an initial structure to form an intermediate structure having a shape based on the convex hull of the target structure; and operating, by the at least one control unit, the forming tool according to a second tool path in relation to the intermediate structure to form one or more inward features into the intermediate structure to form the target structure, wherein the second tool path differs from the first tool path.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a multi-stage incremental sheet forming system and method. The multi-stage incremental sheet forming system and method includes a first forming operation to form an intermediate structure having a shape based on a convex hull of a target structure. For example, the intermediate structure may be formed as the convex hull of the target structure. The intermediate structure is formed through a forming tool operating according to a first tool path (for example, through a predetermined tool path having a starting point and an end point). After the intermediate structure having a shape based on a convex hull of the target structure is formed, the forming tool operates according to a second tool path (for example, through a predetermined tool path having a starting point and an end point) that differs from the first tool path to form inward features in the intermediate structure (for example, the convex hull of the target structure) to form the target structure.

To avoid a potential risk of damage due to steep walls (for example, walls having angles of sixty degrees or greater relative to a level plane), embodiments of the present disclosure form a structure in two stages. In at least one embodiment, the first stage includes a forming tool traversing along a Z level tool path to form the convex hull of a target structure. The second stage includes the forming tool traversing along a lace tool path to form the target structure, which may include one or more inward features. As such, embodiments of the present disclosure are able to form various structures having steep angled walls through incremental sheet forming processes.

Figure 1:
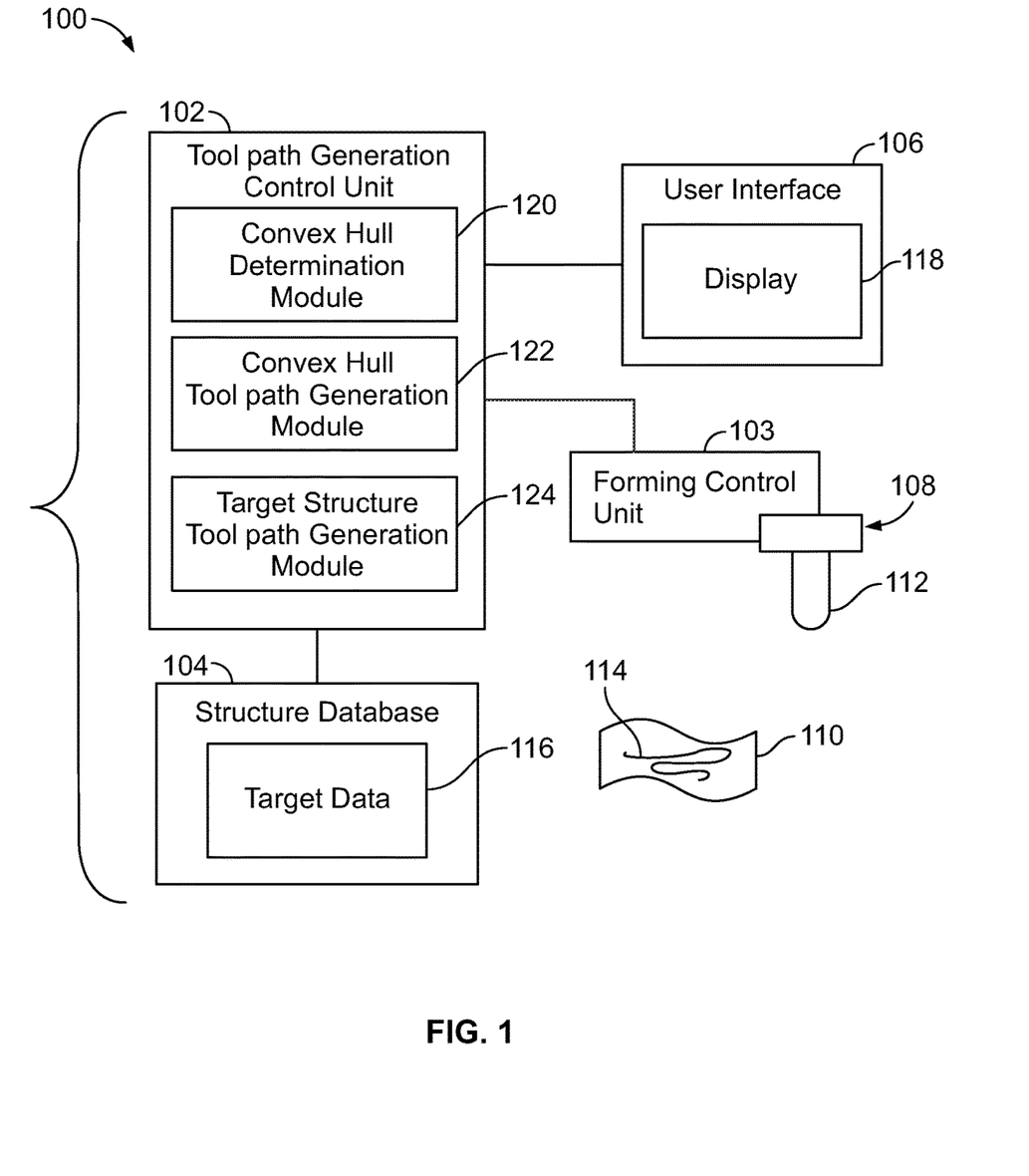
FIG. 1 illustrates a schematic block diagram of a multi-stage incremental sheet forming system, according to an embodiment of the present disclosure.

FIG. 1 illustrates a schematic block diagram of a multi-stage incremental sheet forming system 100, according to an embodiment of the present disclosure. In at least one embodiment, the incremental sheet forming system 100 includes a tool path generation control unit 102 in communication with a structure database 104, such as through one or more wired or wireless connections. The tool path generation control unit 102 may also be in communication with a user interface 106, such as through one or more wired or wireless connections. The tool path generation control unit 102 may be collocated with one or both of the structure database 104 and/or the user interface 106. Optionally, the tool path generation control unit 102 may be remotely located from one or both of the structure database 104 and/or the user interface 106.

The incremental sheet forming system 100 also includes a forming tool or machine 108 that is configured to operate to form a structure 110. In at least one embodiment, the forming tool 108 is a forming stylus having a rounded, blunted operative end 112 that is configured to exert force onto the structure 110 to form various features therein and/or thereon (such as curves, bends, indentations, and/or the like). The forming tool 108 operates on the structure 110 according to a tool path 114 (for example, through a predetermined tool path having a starting point and an end point) to form a desired shape of the structure 110.

In at least one embodiment, the structure 110 is an initial structure, such as a blank piece of metal (such as an alloy of aluminum, titanium, copper, or the like). For example, the initial structure may be a flat, planar piece of metal supported on a die.

In at least one embodiment, the tool path generation control unit 102 is in communication with the forming tool 108, such as through one or more wired or wireless connections. The tool path generation control unit 102 is configured to operate the forming tool 108 to form the desired shape of a target structure, which is formed from an initial structure, such as sheet metal, for example.

The structure database 104 stores various data. For example, the structure database 104 stores target data 116. The target data 116 includes information regarding a target or desired structure to be formed. For example, the target data 116 may include a discrete geometric definition, such as a tessellation, of a target structure to be formed, which may include one or more inward features. Such may be, for example, in the formal of an STL, PLY, or VRML file. Optionally, the target data 116 may include a collection of trimmed parametric surfaces, curves, and points. Such may be, for example, in the format of a STEP, SAT, Parasolids, or IGES file.

The user interface 106 includes a display 118 and includes one or more interface devices, such as a monitor, television, touchscreen, a keyboard, a mouse, and/or the like. The user interface 106 and the tool path generation control unit 102 may be part of a computer workstation, for example. In at least one other embodiment, the tool path generation control unit 102 and the user interface 106 may be part of a handheld device, such as a smart tablet, smart phone, laptop computer, or the like.

In operation, the tool path generation control unit 102 determines the size and shape of a target structure through the target data 116. For example, the target data 116 may include information regarding the size, shape, and features of the target structure, as noted above. In at least one embodiment, the target data 116 may include target structure geometry data, convex hull structure geometry data, manufacturing process data, and tool path data.

The tool path generation control unit 102 analyzes the target data 116 regarding the target structure (such as the geometric definition of the target structure) and determines the convex hull for such target structure. For example, in at least one embodiment, the tool path generation control unit 102 includes a convex hull determination module 120 that analyzes the target data regarding the target structure (for example, a tessellation of the target structure) and determines the convex hull for the target structure.

The convex hull of a set of points S is the smallest convex set containing the set of points S. For a target structure, the convex hull is a smallest convex set that contains all points of the target structure. Within examples, the tool path generation control unit 102 is configured to determine the convex hull of the target structure based on the smallest convex set that contains all points of the target structure. The convex hull (C) of a set of points is the set of every possible convex combination of that set of points.

After the tool path generation control unit 102 determines the convex hull for the target structure, the tool path generation control unit 102 operates the forming tool 108 in relation to the structure 110 (such as a blank piece of metal) according to a first tool path to form an intermediate structure that is based on the convex hull of the target structure. Within examples, the shape of the intermediate structure to be formed is selected based on the convex hull of the target structure. In at least one embodiment, the intermediate structure is having the shape based on the convex hull of the target structure. For example, in at least one embodiment, the tool path generation control unit 102 includes a convex hull tool path generation module 122 (which may also be referred to as a first tool path generation module) that determines the first tool path based on the determined convex hull (and may then save the tool path, such as an ASCII text file in a format such as G-Code or APT Source), and operates the forming tool 108 to form the intermediate structure shaped based on the convex hull of the target structure (for example, having the shape based on the convex hull of the target structure). In at least one embodiment, the first tool path is a Z level tool path for the forming tool 108.

In at least one other embodiment, the intermediate structure is shaped similar to the convex hull of the target structure. For example, the intermediate structure shaped based on the convex hull of the target structure may include one or more inward features, or partially formed inward features, which the convex hull does not otherwise include.

After the tool path generation control unit 102 operates or provides instructions for operating the forming tool 108 to form the intermediate structure, the forming tool 108 is operated in relation to the intermediate structure according to instructions to traverse a second tool path to form the various features of the target structure in relation to the intermediate structure to form the target structure from the intermediate structure. The second tool path differs from the first tool path. For example, in at least one embodiment, the tool path generation control unit 102 includes or is otherwise in communication with a target structure tool path generation module 124 (which may also be referred to as a second tool path generation module) that determines the second tool path based on a tessellation of the target structure, which may include the inward features to be formed. A control unit, such as the tool path generation control unit 102 or a separate and distinct forming control unit 103 operatively coupled to the forming tool 108, operates the forming tool 108 to form the target structure from the intermediate structure. In at least one embodiment, the second tool path is a lace tool path for the forming tool 108.

As an example, the forming control unit 103 receives instructions from the tool path generation control unit 102 to operate the forming tool 108, as described herein. As another optional example, the tool path generation control unit 102 may directly operate the forming tool 108. In at least one embodiment, the tool path generation control unit 102 and the forming control unit 103 may be separate and distinct control units. As another example, the tool path generation control unit 102, and the forming control unit 103 may be part of a common processing or control system or unit. For example, the tool path generation control unit 102 and the forming control unit 103 may be portions of an integrated chip, processing device, and/or the like.

Within examples, as the tool path generation control unit 102 operates the forming tool 108 to form the target structure from the intermediate structure, the forming tool 108 forms one or more inward features into the intermediate structure having the shape based on the convex hull of the target structure. As such, within examples, the inward features are formed after the convex hull is formed. The target structure is not formed in a single stage, in which the forming tool 108 operates on a structure according to a single tool path to form the target structure. Instead, the forming tool 108 first operates according to a first tool path (for example, operates the forming tool 108 through a predetermined tool path having a starting point and an end point) in relation to an initial structure (such as a blank piece of metal) to first form the intermediate structure having the shape based on the convex hull of the target structure. After the intermediate structure is formed, the forming tool 108 subsequently operates according to a second tool path in relation to the intermediate structure to form one or more inward features in relation to (for example, on and/or in) the intermediate structure to form the target structure. By first forming the convex hull, and subsequently forming the inward features into the convex hull, embodiments of the present disclosure result in less thinning and present a reduced risk of damaging the material, even if portions of the structure are at steep angles (in contrast to single pass incremental sheet forming processes, which risk damaging steep walls when forming inward features).

The inward features are features that are formed into outer walls of the structure. For example, the inward features include indentations, cavities, divots, channels, recesses, grooves, creases, pockets, insets, holes, or the like.

As described herein, the multi-stage incremental sheet forming system 100 includes the forming tool 108 and the tool path generation control unit 102 in communication with the forming tool 108, either directly and/or through the forming control unit 103. The tool path generation control unit 102 is configured to determine the convex hull of the target structure (such as the convex hull of the geometric representation of the target structure) to be formed by the forming tool 108. The tool path generation control unit 102 is configured to operate the forming tool 108 according to a first tool path in relation to an initial structure (for example, a blank piece of sheet metal, such as the structure 110) to form the intermediate structure shaped based on the convex hull of the target structure (for example, shaped as the convex hull of the target structure). The tool path generation control unit 102 is further configured to operate the forming tool 108 according to a second tool path in relation to the intermediate structure to form one or more inward features into the intermediate structure to form the target structure.

Figure 2:
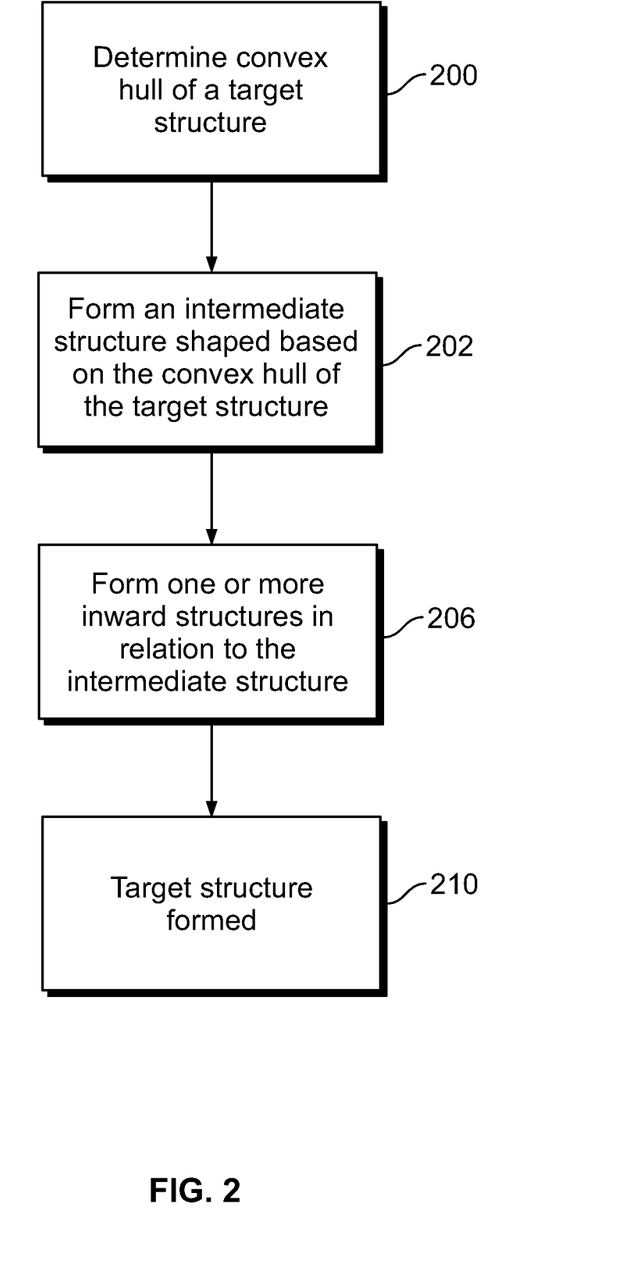
FIG. 2 illustrates a flow chart of a multi-stage incremental sheet forming method, according to an embodiment of the present disclosure.

FIG. 2 illustrates a flow chart of a multi-stage incremental sheet forming method, according to an embodiment of the present disclosure. In at least one embodiment, one or more control units, such as the tool path generation control unit 102 and the forming control unit 103, operates according to the flow chart shown and described with respect to FIG. 2.

Referring to FIGS. 1 and 2, at 200, the tool path generation control unit 102 determines the convex hull of a target structure. For example, the tool path generation control unit 102 (such as the convex hull determination module 120) analyzes the target data 116, which includes the geometric representation of the target structure, and determines the convex hull for the target structure (that is, determines the convex hull for the geometric representation of the target structure).

At 202, an intermediate structure shaped based on as the convex hull of the target structure is formed. For example, the tool path generation control unit 102 (such as the convex hull tool path generation module 122) outputs instructions for operating the forming tool 108 according to (for example, to traverse along) a first tool path on an initial structure (such as a blank piece of metal) to form the intermediate structure having the shape based on the convex hull of the target structure.

If the intermediate structure has been successfully formed (for example, if the convex hull of the target structure is fully formed), the method proceeds to 206, at which one or more inward features are formed in relation to the intermediate structure. For example, the tool path generation control unit 102 (such as the target structure tool path generation module 124) outputs instructions for operating the forming tool 108 according to a second tool path on the intermediate structure to form the inward feature(s). If all of the inward features of the target structure are formed in relation to the intermediate structure, the method proceeds to 210, at which the target structure is formed.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the tool path generation control unit 102 and the forming control unit 103 can be or include one or more processors that are configured to control operation thereof, as described herein.

A module is one or more portions of a control unit. For example, the module may be a portion of a chip, circuit, processor, or the like. As another example, the module may be a chip, circuit, processor, or the like. In general, a module may be a sub control unit. For example, the convex hull determination module 120, the convex hull tool path generation module 122, and the target structure tool path generation module 124 are components of the tool path generation control unit 102.

The tool path generation control unit 102 and the forming control unit 103 are configured to execute a set of instructions that are stored in one or more data storage units or elements (such as one or more memories), in order to process data. For example, the tool path generation control unit, the tool path generation control unit 102, and the forming control unit 103 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the non-volatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the tool path generation control unit 102 and the forming control unit 103 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein illustrate one or more control or processing units, such as the tool path generation control unit 102 and the forming control unit 103. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the tool path generation control unit 102 and the forming control unit 103 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
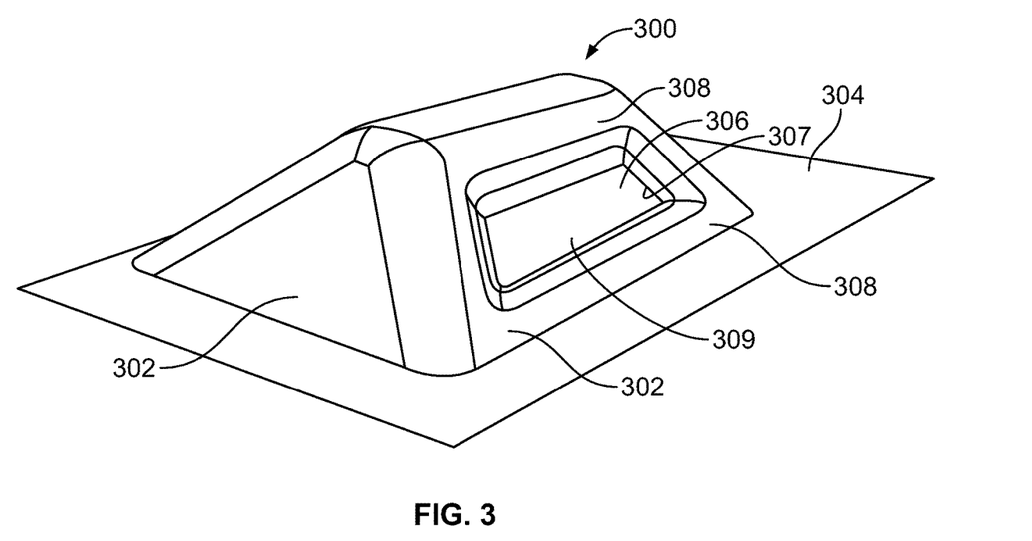
FIG. 3 illustrates a perspective view of a target structure, according to an embodiment of the present disclosure.

FIG. 3 illustrates a perspective view of a target structure 300, according to an embodiment of the present disclosure. The target structure 300 is a structure that is desired to be formed. In at least one embodiment, the target structure 300 has one or more walls 302. In at least one embodiment, the target structure 300 has one or more walls 302, which collectively form at least one arcuate cavity inward feature 306. As an example, the walls 302 are set at angles in relation to a reference plane 304 of forty degrees or more (for example, sixty degrees or more) in relation to a target structure 300. For example, the reference plane 304 is a reference plane that is orthogonal to the Z axis (such as an X-Y plane) in a Cartesian coordinate system. In an example, the part of the at least one wall 302 corresponding to the inward feature 306 includes one or more portions that are set at angles in relation to reference plane 304 of sixty degrees or more.

The target structure 300 includes at least one inward feature 306 that is inset into at least one wall 302. For example, the inward feature 306 may be or include an inset 307, such as an inwardly-directed feature. As shown, the inward feature 306 includes a pocket 309 that is inward from an outer envelope 308 of the wall 302. The outer envelope 308 is an outermost surface of the wall 302.

Referring to FIGS. 1 and 3, the target data 116 includes information regarding the target structure 300. For example, the target data 116 includes information regarding the size, shape, and the inward feature(s) 306 of the target structure 300. In at least one embodiment, the structure database 104 also stores manufacturing data (such as may be included in the target data 116 or stored separately), which includes information about the process, such as a tool type, tool shape, tool size, and tool feedrate.

Figure 4:
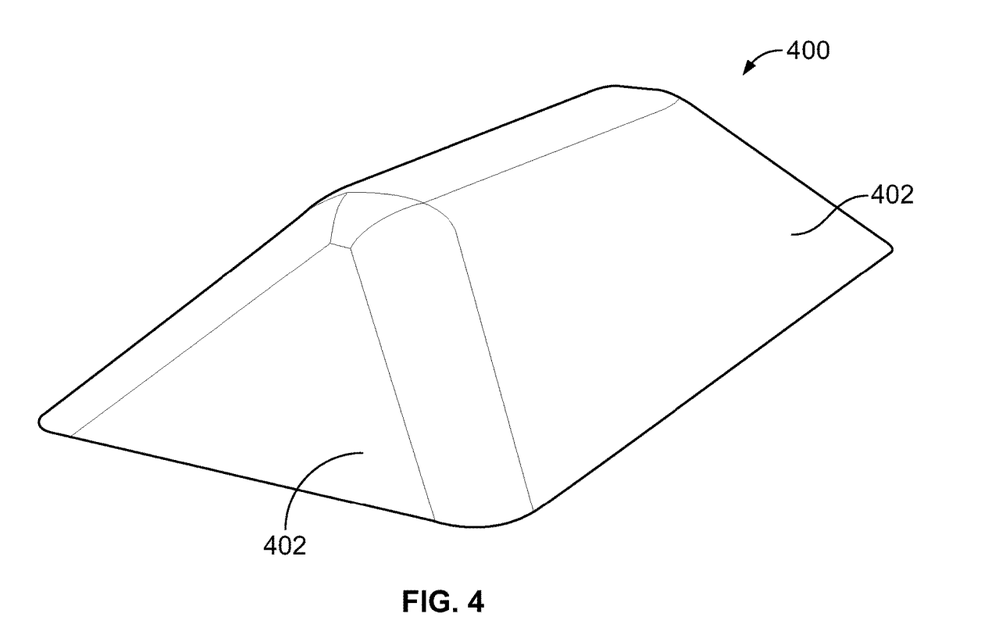
FIG. 4 illustrates a perspective view of an intermediate structure having the shape based on the convex hull of the target structure of FIG. 3, according to an embodiment of the present disclosure.

FIG. 4 illustrates a perspective view of an intermediate structure 400 shaped as a convex hull of the target structure 300 (shown in FIG. 3), according to an embodiment of the present disclosure. As shown, the intermediate structure 400 is the convex hull of the target structure 300.

Referring to FIGS. 1, 3, and 4, the tool path generation control unit 102 determines the convex hull of the target structure 300. The tool path generation control unit 102 then determines a first tool path based on the convex hull of the target structure 300. The forming control unit 103 then operates according to a first tool path on an initial structure (such as the structure 110 shown in FIG. 1) to form the intermediate structure 400.

The intermediate structure 400, which is the convex hull of the target structure 300, is devoid of the inward features 306. For example, walls 402 of the intermediate structure 400 are smooth without any inward formations.

Figure 5:
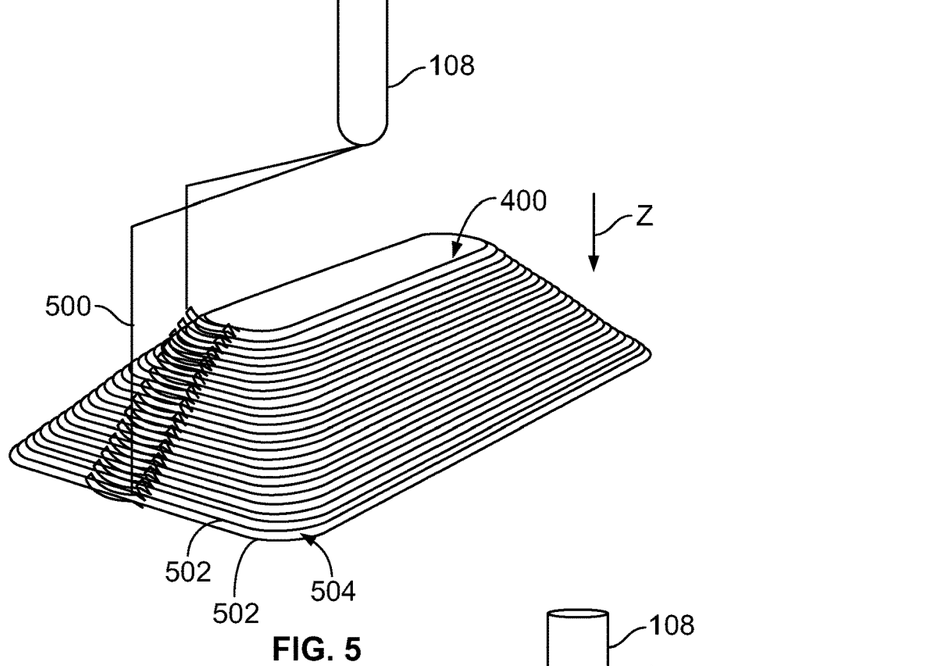
FIG. 5 illustrates a perspective view of a forming tool operating according to a first tool path to form the intermediate structure of FIG. 4.

FIG. 5 illustrates a perspective view of the forming tool 108 operating according to a first tool path 500 to form the intermediate structure 400 of FIG. 4. Referring to FIGS. 1 and 5, the first tool path 500 may be a Z level tool path, in which the forming tool 108 engages (for example, is driven into) the initial structure 110 at horizontal or Z levels 502 to form the intermediate structure 400, which is the convex hull of the target structure 300 (shown in FIG. 3). Adjacent Z levels 502 are separated by a predetermined spacing 504.

Figure 6:
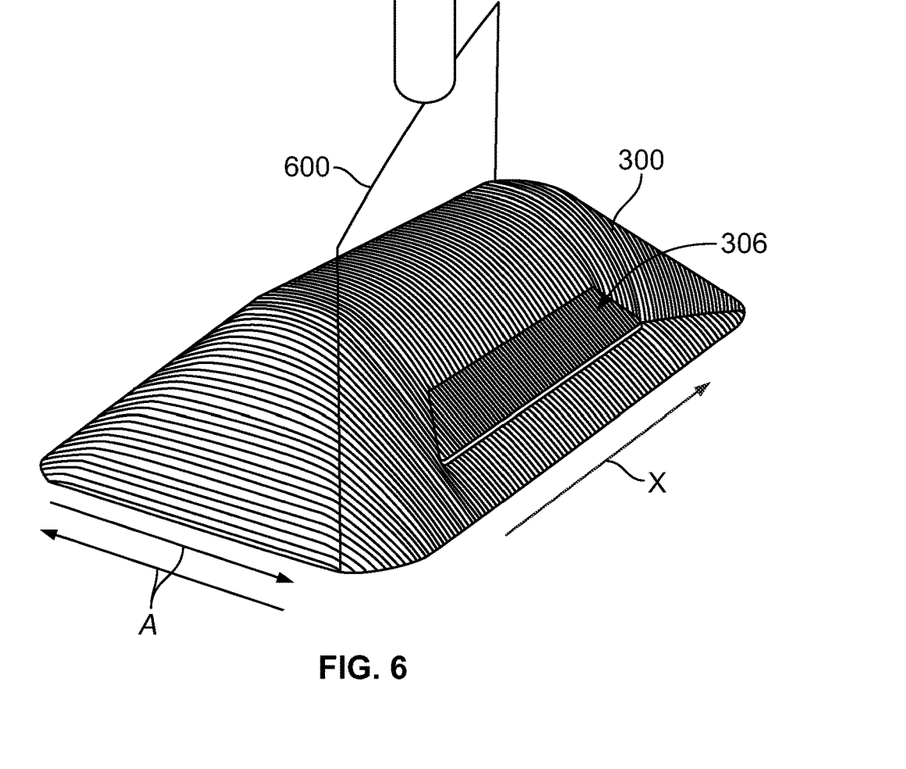
FIG. 6 illustrates a perspective view of the forming tool operating according to a second tool path to form the target structure of FIG. 3.

FIG. 6 illustrates a perspective view of the forming tool 108 operating according to a second tool path 600 to form the target structure of FIG. 3. Referring to FIGS. 1 and 6, the second tool path 600 may be a lace tool path that alternates, back and forth, in the directions denoted by arrows A (for example, in X or Y directions, which are orthogonal to the Z direction) over the intermediate structure to form the inward feature(s) 306. The Z level path of the first tool path 500 (shown in FIG. 5) moves along contours in the X-Y plane while advancing in the Z direction, while the lace path of the second tool path 600 moves back and forth, such as alternately from side-to-side (or end-to-end), while proceeding in the X direction. The forming tool 108 operates according to the second tool path 600 after the intermediate structure 400 (shown in FIG. 4) is formed, thereby forming the inward feature(s) 306 into the intermediate structure 400 to form the target structure 300.

Figure 7:
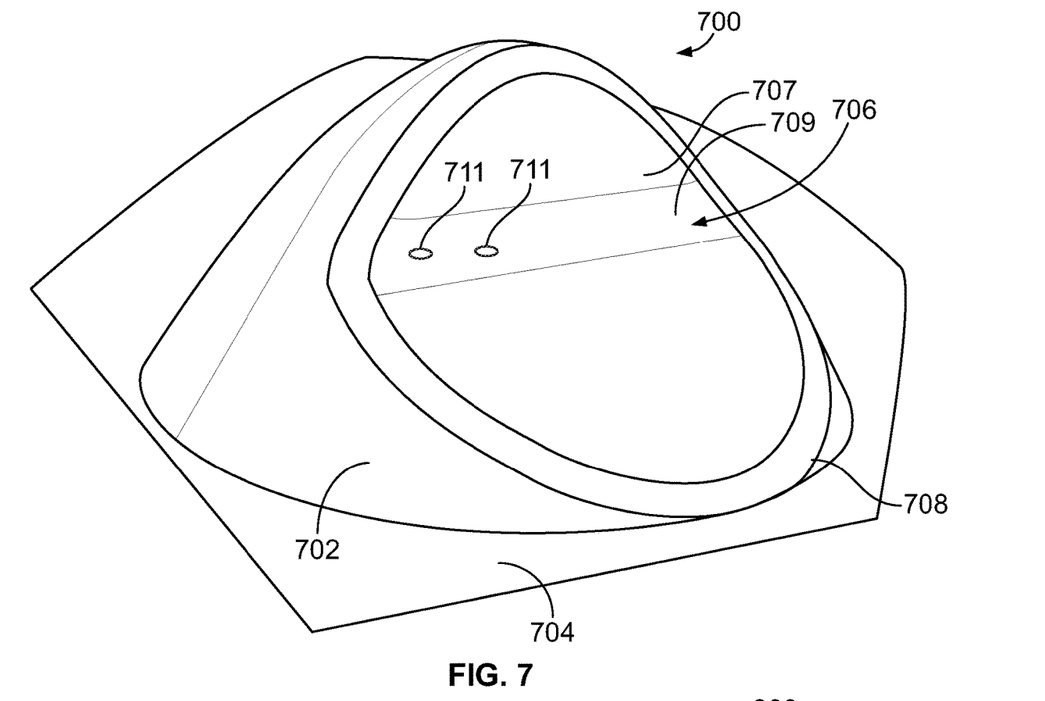
FIG. 7 illustrates a perspective view of a target structure, according to an embodiment of the present disclosure.

FIG. 7 illustrates a perspective view of a target structure 700, according to an embodiment of the present disclosure. The target structure 700 is a structure that is desired to be formed. In at least one embodiment, the target structure 700 has one or more walls 702, which collectively form at least one inward feature 706, which is illustrated as an arcuate cavity. As an example, the walls 702 contain a maximum wall angle in relation to a reference plane 704 of sixty degrees or more.

The target structure 700 includes the at least one inward feature 706 formed into at least one wall 702. As shown, the inward feature 706 includes an indentation 707 having a crease 709 and/or one or more divots 711 that is inward from an outer envelope 708 of the wall 702.

Figure 8:
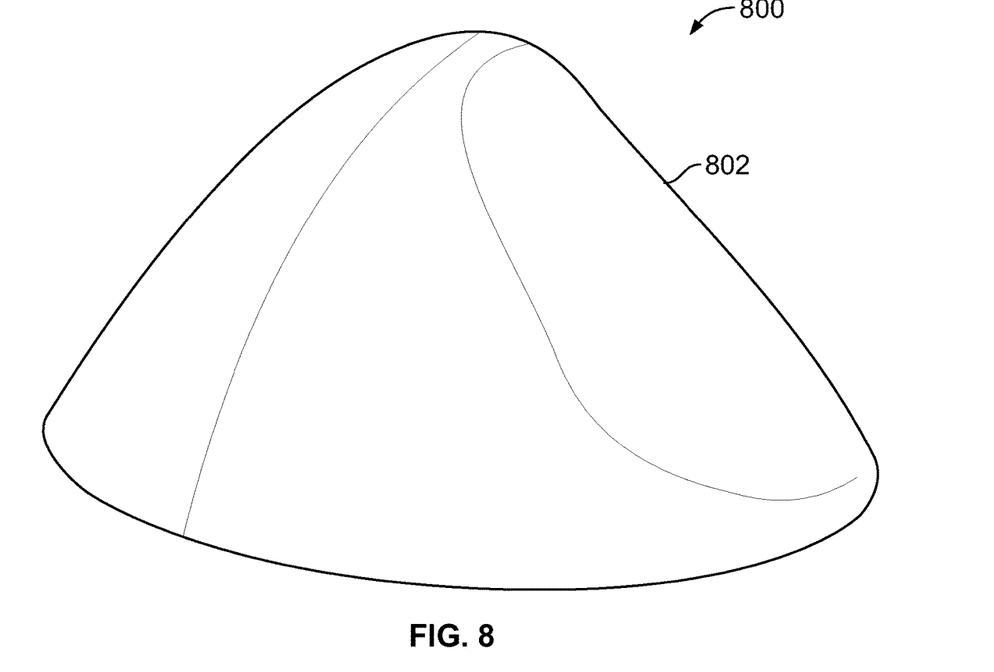
FIG. 8 illustrates a perspective view of an intermediate structure shaped as a convex hull of the target structure of FIG. 7, according to an embodiment of the present disclosure.

FIG. 8 illustrates a perspective view of an intermediate structure 800 shaped as a convex hull of the target structure 700 (shown in FIG. 7), according to an embodiment of the present disclosure. As shown, the intermediate structure 800 is the convex hull of the target structure 700.

The intermediate structure 800, which is the convex hull of the target structure 700, is devoid of the inward feature 706. For example, walls 802 of the intermediate structure 800 are smooth without any inward formations corresponding to inward features 706 of target structure 700.

Figure 9:
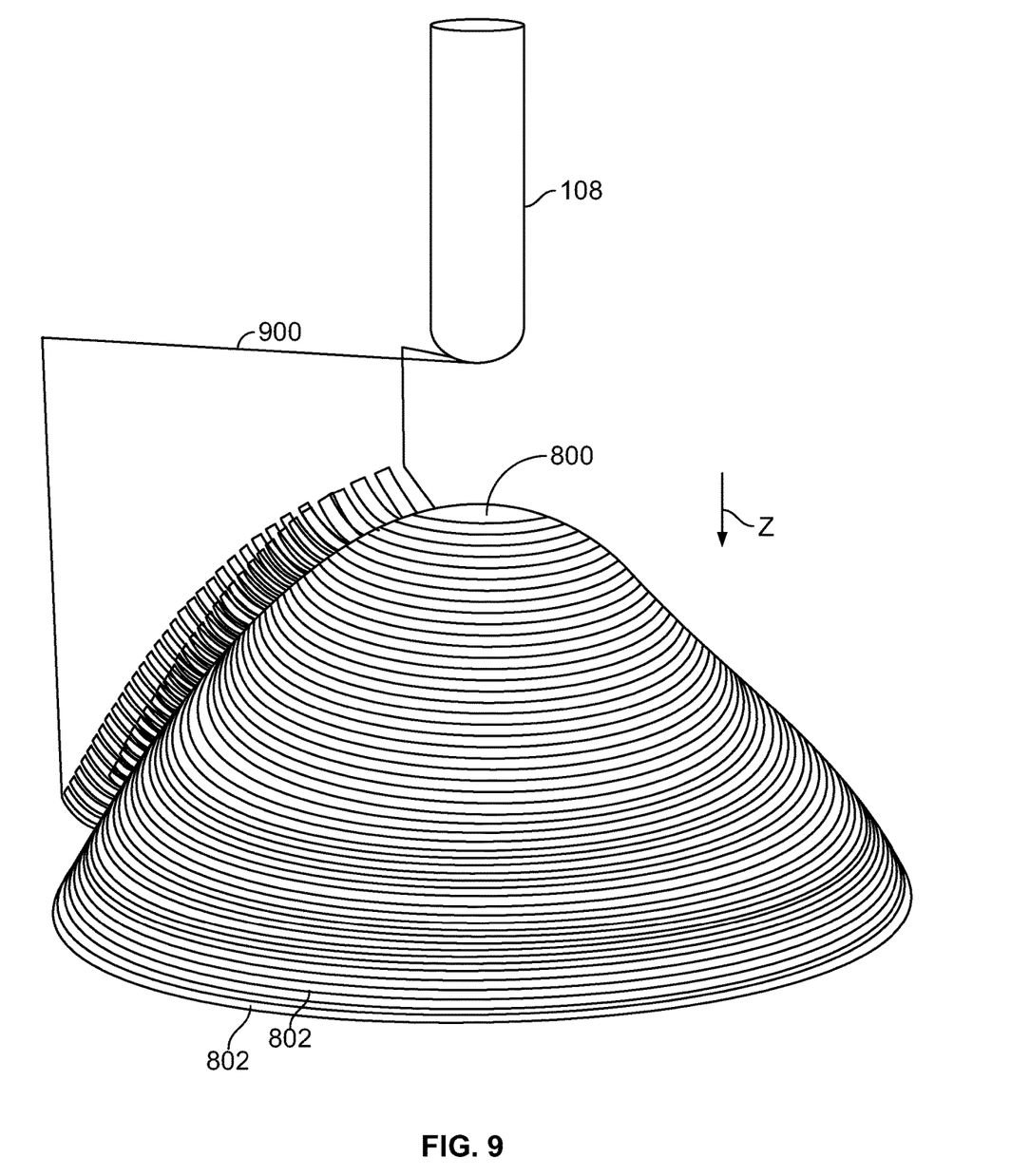
FIG. 9 illustrates a perspective view of a forming tool operating according to a first tool path to form the intermediate structure of FIG. 8.

FIG. 9 illustrates a perspective view of the forming tool 108 operating according to a first tool path 900 to form the intermediate structure 800 of FIG. 8. Referring to FIGS. 1 and 9, the first tool path 900 may be a Z level tool path, in which the forming tool 108 engages (for example, is driven into) the structure 110 at vertical or Z levels to form the intermediate structure 800.

Figure 10:
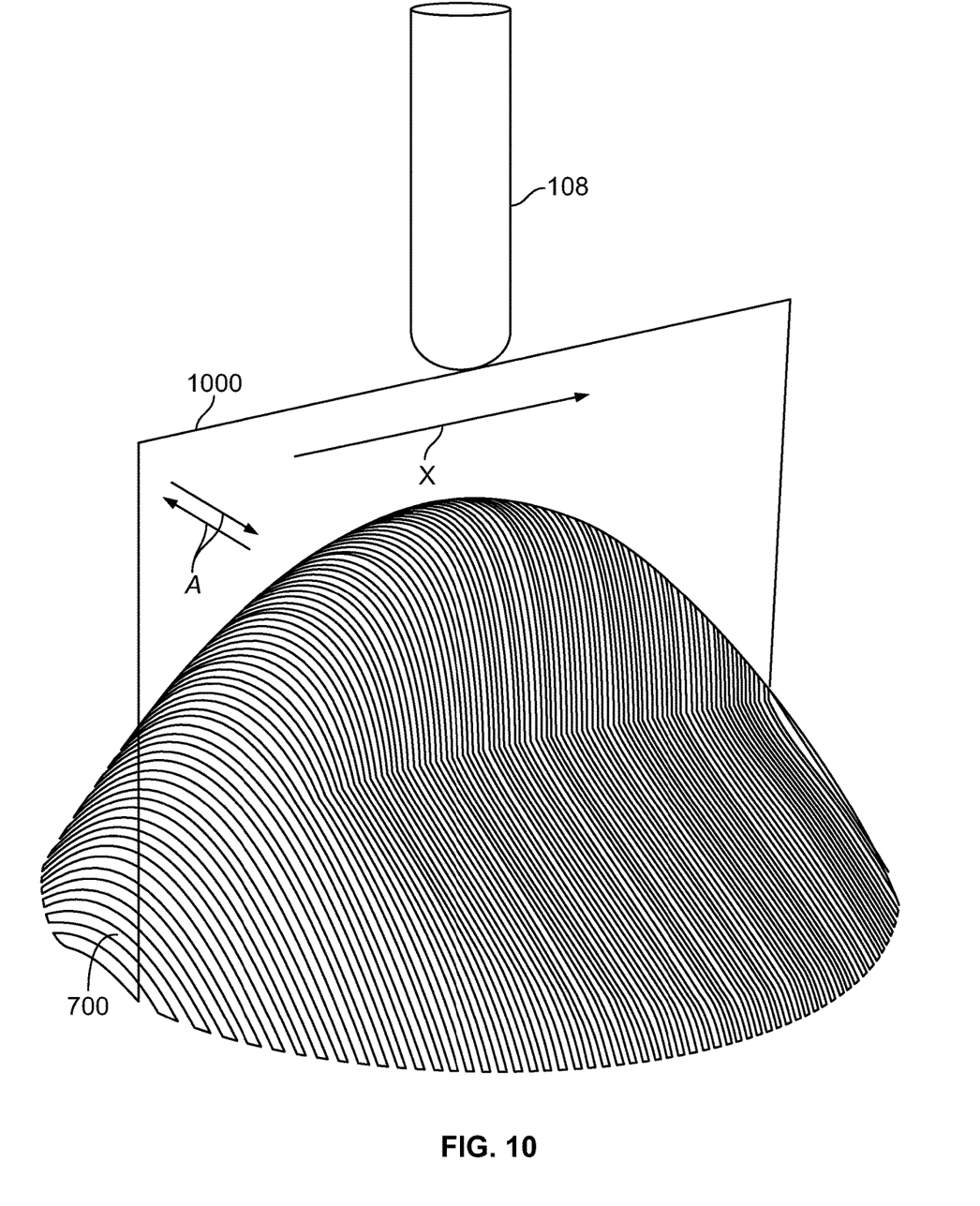
FIG. 10 illustrates a perspective view of the forming tool operating according to a second tool path to form the target structure of FIG. 7.

FIG. 10 illustrates a perspective view of the forming tool 108 operating according to a second tool path 1000 to form the target structure. Referring to FIGS. 1 and 10, the second tool path 1000 may be a lace tool path that alternates, back and forth, in the directions denoted by arrows A (for example, in X or Y directions, which are orthogonal to the Z direction) over the intermediate structure to form the inward feature(s) 706. The Z level path of the first tool path 900 (shown in FIG. 9) moves along contours in the X-Y plane while advancing in the Z direction, while the lace path of the second tool path 1000 moves back and forth, such as alternately from side-to-side (or end-to-end), and progresses in the X direction. The forming tool 108 operates according to the second tool path 1000 after the intermediate structure 800 (shown in FIG. 8) is formed, thereby forming the inward feature(s) 706 into the intermediate structure 800 to form the target structure 700.

Figure 11:
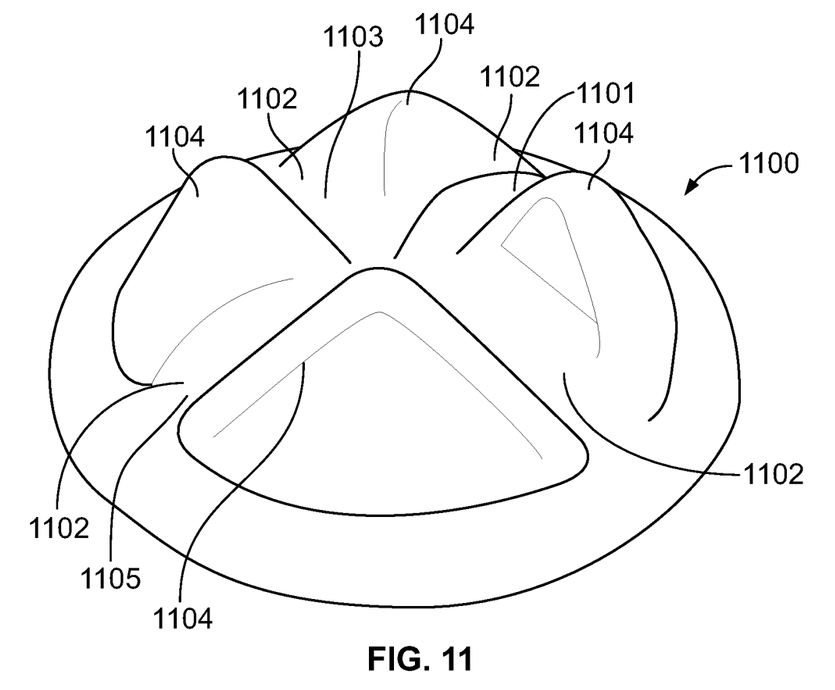
FIG. 11 illustrates a perspective view of a target structure, according to an embodiment of the present disclosure.

FIG. 11 illustrates a perspective view of a target structure 1100, according to an embodiment of the present disclosure. The target structure 1100 includes a plurality of inward features 1102, such as grooves 1101, channels 1103, and recesses 1105 between peaks 1104.

Figure 12:
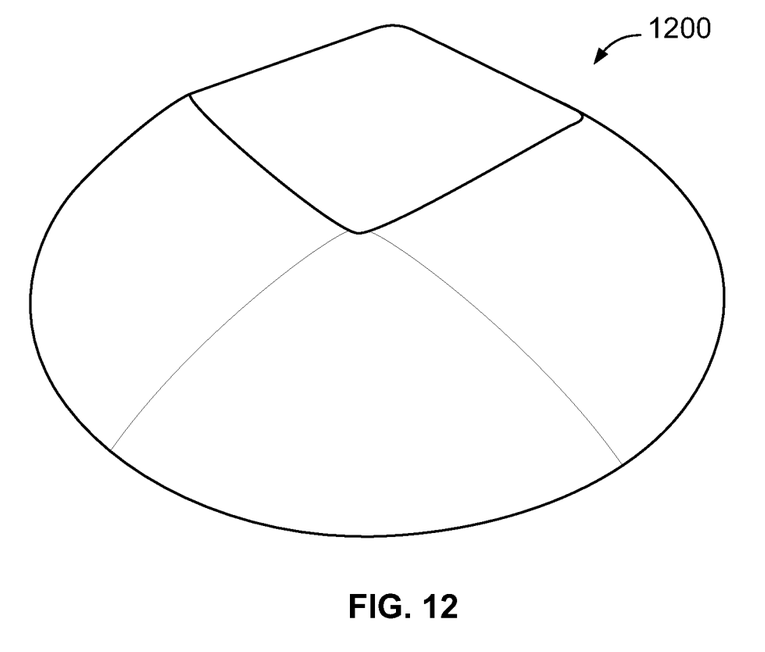
FIG. 12 illustrates a perspective view of an intermediate structure shaped as a convex hull of the target structure of FIG. 11, according to an embodiment of the present disclosure.

FIG. 12 illustrates a perspective view of an intermediate structure 1200 shaped as a convex hull of the target structure 1100 of FIG. 11, according to an embodiment of the present disclosure. The intermediate structure 1200 is devoid of the inward features 1102 shown in FIG. 11.

Figure 13:
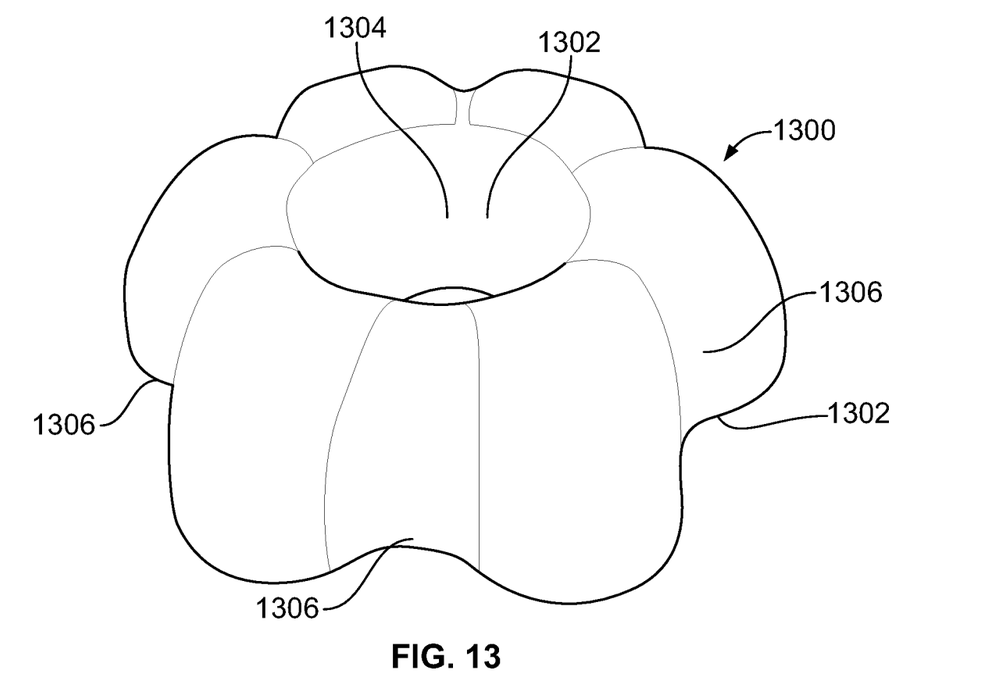
FIG. 13 illustrates a perspective view of a target structure, according to an embodiment of the present disclosure.

FIG. 13 illustrates a perspective view of a target structure 1300, according to an embodiment of the present disclosure. The target structure 1300 includes a plurality of inward features 1302, such as a hole or central passage 1304 and outer indentations 1306.

Figure 14:
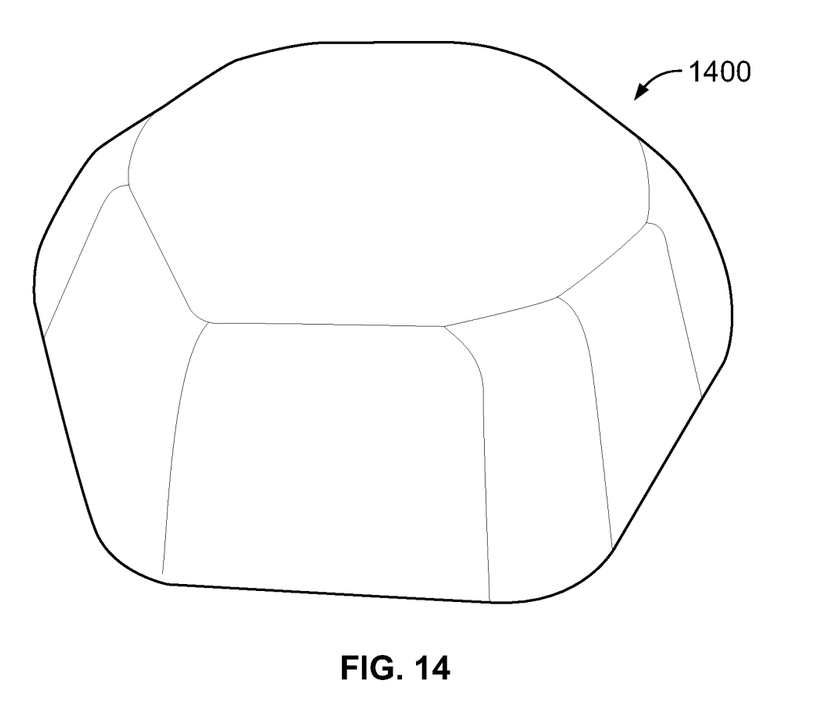
FIG. 14 illustrates a perspective view of an intermediate structure shaped as a convex hull of the target structure of FIG. 13, according to an embodiment of the present disclosure.

FIG. 14 illustrates a perspective view of an intermediate structure 1400 shaped as a convex hull of the target structure 1300 of FIG. 13, according to an embodiment of the present disclosure. The intermediate structure 1400 is devoid of the inward features 1302 shown in FIG. 13.

FIGS. 3, 7, 11, and 13 show examples of target structures, while FIGS. 4, 8, 12, and 14 show examples of intermediate structures, which represent the convex hulls of the aforementioned target structures, respectively. It is to be understood that such target structures and intermediate structures are merely exemplary. The target structures may be sized and shaped differently, and have more or less inward features (shaped as shown or differently than shown). Associated intermediate shapes selected based on the convex hull of the target structure may therefore be sized and shaped differently than shown.

Referring to FIGS. 1-14, embodiments of the present disclosure provide systems and methods that allow large amounts of data to be quickly and efficiently analyzed by a computing device. For example, a target structure may include thousands, if not millions of points, connected together by polygons, such as triangles. Moreover, operating a forming tool to accurately form an intermediate structure and a target structure may not be efficiently performed in a manual fashion. As such, large amounts of data are being analyzed, and operation of the forming tool 108 is automatically performed based on the analysis. The vast amounts of data are efficiently organized and/or analyzed by the tool path generation control unit 102, as described above, which further operates and/or outputs instructions for operating the forming tool 108. The tool path generation control unit 102 analyzes the data in a relatively short time in order to quickly and efficiently determine the size and shape of the intermediate structure, generate a first tool path, form the intermediate structure, generate a second tool path, and form the target structure. A human being would be incapable of efficiently analyzing such vast amounts of data in such a short time. As such, embodiments of the present disclosure provide increased and efficient functionality, and vastly superior performance in relation to a human being analyzing the vast amounts of data.

In at least one embodiment, components of the multi-stage incremental sheet forming system 100, such as the tool path generation control unit 102, provide and/or enable a computer system to operate as a special computer system for incremental sheet forming processes.

As described herein, embodiments of the present disclosure provide systems and methods of forming a structure having steep walls (for example, walls angled at sixty degrees or greater) through incremental sheet forming. Further, embodiments of the present disclosure provide incremental sheet forming systems and methods that are less susceptible to damaging (for example, tearing) structural material at steep angles (for example, sixty degrees or greater).

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A multi-stage incremental sheet forming system, comprising:
   a forming tool;
   and at least one control unit in communication with the forming tool,
   the at least one control unit configured to determine a convex hull of a target structure to be formed by the forming tool, wherein the convex hull is the smallest convex set that contains all points of the target structure,
   the at least one control unit configured to operate the forming tool according to a first tool path in relation to an initial structure to form an intermediate structure having a shape based on the convex hull of the target structure,
   and the at least one control unit configured to operate the forming tool according to a second tool path in relation to the intermediate structure to form one or more inward features into the intermediate structure to form the target structure, wherein the second tool path differs from the first tool path.

2. The multi-stage incremental sheet forming system of claim 1, wherein the at least one control unit comprises:
   a tool path generation control unit configured to determine at least one tool path and the convex hull of the target structure; and
   a forming control unit configured to operate the forming tool.

3. The multi-stage incremental sheet forming system of claim 1, wherein the at least one control unit comprises a tool path generation control unit configured to determine the convex hull of the target structure based on the smallest convex set that contains all points of the target structure.

4. The multi-stage incremental sheet forming system of claim 1, further comprising a structure database in communication with the at least one control unit, wherein the structure database stores target data including information regarding a size of the target structure, a shape of the target structure, the one or more inward features of the target structure, and manufacturing data including tool shape, tool size, and tool feed rate.

5. The multi-stage incremental sheet forming system of claim 1, wherein the at least one control unit comprises a tool path generation control unit including a convex hull determination module that analyzes target data regarding the target structure and determines the convex hull for the target structure based on the target data.

6. The multi-stage incremental sheet forming system of claim 1, wherein the at least one control unit comprises a tool path generation control unit including a convex hull tool path generation module that determines the first tool path based on the determined convex hull, and wherein a forming control unit operates the forming tool according to the first tool path in relation to the initial structure to form the intermediate structure having the shape based on the convex hull of the target structure.

7. The multi-stage incremental sheet forming system of claim 1, wherein the first tool path is a Z level tool path.

8. The multi-stage incremental sheet forming system of claim 1, wherein the at least one control unit comprises a tool path generation control unit including a target structure tool path generation module that is configured to one or both of operate or output instructions for operating the forming tool according to the second tool path in relation to the intermediate structure to form the one or more inward features into the intermediate structure to form the target structure.

9. The multi-stage incremental sheet forming system of claim 1, wherein the second tool path is a lace tool path.

10. The multi-stage incremental sheet forming system of claim 1, wherein the one or more inward features comprises one or more of at least one indentation, at least one cavity, at least one divot, at least one channel, at least one recess, at least one groove, at least one crease, at least one pocket, at least one inset, or at least one hole.

11. The multi-stage incremental sheet forming system of claim 1, wherein the target structure comprises at least one wall set at an angle of at least sixty degrees in relation to a level plane.

12. The multi-stage incremental sheet forming system of claim 1, wherein the intermediate structure is devoid of the one or more inward features.

13. A multi-stage incremental sheet forming method, comprising:
   determining, by at least one control unit, a convex hull of a target structure to be formed by a forming tool, wherein the convex hull is the smallest convex set that contains all points of the target structure;
   operating, by the at least one control unit, the forming tool according to a first tool path in relation to an initial structure to form an intermediate structure having a shape based on the convex hull of the target structure;
   and operating, by the at least one control unit, the forming tool according to a second tool path in relation to the intermediate structure to form one or more inward features into the intermediate structure to form the target structure, wherein the second tool path differs from the first tool path.

14. The multi-stage incremental sheet forming method of claim 13, further comprising storing, in a structure database, target data including information regarding a geometric representation of the target structure including the one or more inward features of the target structure.

15. The multi-stage incremental sheet forming method of claim 13, wherein said determining comprises determining, by a convex hull determination module, the convex hull of the target structure.

16. The multi-stage incremental sheet forming method of claim 13, wherein said operating, by the at least one control unit, the forming tool according to the first tool path comprises operating, by a convex hull tool path generation module, the forming tool according to the first tool path in relation to the initial structure to form the intermediate structure having the shape based on the convex hull of the target structure.

17. The multi-stage incremental sheet forming method of claim 13, wherein the first tool path is a Z level tool path, and wherein the second tool path is a lace tool path.

18. The multi-stage incremental sheet forming method of claim 13, wherein said operating, by the at least one control unit, the forming tool according to the second tool path comprises operating, by a target structure tool path generation module, the forming tool according to the second tool path in relation to the intermediate structure to form the one or more inward features into the intermediate structure to form the target structure.

19. The multi-stage incremental sheet forming method of claim 13, wherein the one or more inward features comprises one or more of at least one indentation, at least one cavity, at least one divot, at least one channel, at least one recess, at least one groove, at least one crease, at least one pocket, at least one inset, or at least one hole.

20. The multi-stage incremental sheet forming method of claim 13, wherein the target structure comprises at least one wall set at an angle of at least sixty degrees in relation to a reference plane.

21. The multi-stage incremental sheet forming method of claim 13, wherein the intermediate structure is devoid of the one or more inward features.

22. A multi-stage incremental sheet forming system, comprising:
   a forming tool;
   at least one control unit in communication with the forming tool;
   and a structure database in communication with the at least one control unit, wherein the structure database stores target data including information regarding a geometric representation of a target structure and one or more inward features of the target structure, wherein the one or more inward features comprise one or more of at least one indentation, at least one cavity, at least one divot, at least one channel, at least one recess, at least one groove, at least one crease, at least one pocket, at least one inset, or at least one hole,
   the at least one control unit comprises:
      a convex hull determination module configured to determine a convex hull of a target structure to be formed by the forming tool, wherein the convex hull is the smallest convex set that contains all points of the target structure;
      a convex hull tool path generation module configured to one or both of operate or output instructions for operating the forming tool according to a Z level tool path in relation to an initial structure to form an intermediate structure having a shape based on the convex hull of the target structure, wherein the intermediate structure is devoid of the one or more inward features;
   and a target structure tool path generation module configured to one or both of operate or output instructions for operating the forming tool according to a lace tool path in relation to the intermediate structure to form the one or more inward features into the intermediate structure to form the target structure.

\* \* \* \* \*